United States Patent
Preisendörfer

(10) Patent No.: US 7,918,486 B2
(45) Date of Patent: Apr. 5, 2011

(54) CONNECTOR SEAL COMPRISING RACHET TEETH

(75) Inventor: Gerhard Preisendörfer, Heusenstamm (DE)

(73) Assignees: Rehau AG & Co., Rehau (DE); PT-Poly-Tec GmbH Vertrieb und Hertellung Von Dichtungssystemen, Heusenstamm (DE)

( * ) Notice: Subject to any disclaimer, the term of this patent is extended or adjusted under 35 U.S.C. 154(b) by 1353 days.

(21) Appl. No.: 10/563,249

(22) PCT Filed: Jul. 2, 2004

(86) PCT No.: PCT/EP2004/007231
§ 371 (c)(1),
(2), (4) Date: May 22, 2006

(87) PCT Pub. No.: WO2005/003615
PCT Pub. Date: Jan. 13, 2005

(65) Prior Publication Data
US 2007/0108763 A1 May 17, 2007

(30) Foreign Application Priority Data
Jul. 4, 2003 (DE) .................................. 203 10 390

(51) Int. Cl.
*F16L 41/08* (2006.01)
*F16L 5/10* (2006.01)

(52) U.S. Cl. ...................... 285/216; 285/136.1; 285/196; 285/215; 285/332.2; 285/334.3; 285/338

(58) Field of Classification Search .................. 285/31, 285/104, 105, 129.1, 136.1, 137.11, 139.1, 285/139.2, 139.3, 140.1, 141.1, 143.1, 196, 285/213, 214, 215, 216, 217, 218, 219, 220, 221, 231, 232, 332.2, 332.3, 334.1, 334.2, 334.3, 338, 346, 392
See application file for complete search history.

(56) References Cited

U.S. PATENT DOCUMENTS
806,156 A * 12/1905 Marshall ........................ 411/334
(Continued)

FOREIGN PATENT DOCUMENTS
DE    93 08 441    9/1993
(Continued)

OTHER PUBLICATIONS
International Preliminary Report on Patentability and Written Opinion of the International Searching Authority (English Translation), dated May 29, 2006, issued in connection with counterpart Application No. PCT/EP2004/007231.

*Primary Examiner* — James M Hewitt
(74) *Attorney, Agent, or Firm* — Venable LLP; Robert Kinberg; Ryan M. Flandro

(57) ABSTRACT

A connector seal device for connecting a branch pipe to a transverse opening of a main pipe, including a hollow elastomer insert of a first material and a pipe union of a harder second material. The elastomer insert may include a flexible support collar, a sealing wall region with a tapered inside surface having first locking ring zones, and an outside surface adapted to fit the transverse opening. The pipe union may include an engagement end with a tapered outside surface having second locking ring zones. The pipe union may include a socket end adapted to cooperate with the branch pipe. When the elastomer insert is inserted into the transverse opening and the pipe union is pushed into the elastomer insert, the first and second locking ring zones engage in the manner of ratchet teeth to press the elastomer insert against the transverse opening.

28 Claims, 4 Drawing Sheets

U.S. PATENT DOCUMENTS

| | | | | |
|---|---|---|---|---|
| 1,471,045 | A * | 10/1923 | Maupin et al. | 285/32 |
| 2,711,913 | A * | 6/1955 | Jungblut | 285/333 |
| 2,825,584 | A * | 3/1958 | Badger et al. | 285/95 |
| 3,749,424 | A * | 7/1973 | Greene | 285/139.1 |
| 4,005,884 | A * | 2/1977 | Drori | 285/323 |
| 4,560,189 | A * | 12/1985 | Lang et al. | 285/136.1 |
| 4,607,865 | A * | 8/1986 | Hughes | 285/18 |
| 4,694,513 | A * | 9/1987 | Kiziah | 4/288 |
| 4,768,560 | A * | 9/1988 | Logsdon | 138/90 |
| 4,802,792 | A * | 2/1989 | Flessas | 405/53 |
| 4,817,991 | A | 4/1989 | Frentzel et al. | |
| 4,828,296 | A * | 5/1989 | Medvick | 285/139.1 |
| 4,900,066 | A * | 2/1990 | Brammer et al. | 285/92 |
| 4,919,461 | A * | 4/1990 | Reynolds | 285/148.13 |
| 4,989,902 | A * | 2/1991 | Putch | 285/18 |
| 5,305,903 | A * | 4/1994 | Harde | 220/86.2 |
| 5,433,487 | A * | 7/1995 | Kuhn et al. | 285/136.1 |
| 5,456,499 | A * | 10/1995 | Sharpe | 285/39 |
| 5,649,712 | A * | 7/1997 | Ekholm | 277/607 |
| 5,954,345 | A * | 9/1999 | Svoboda et al. | 277/626 |
| 5,971,444 | A * | 10/1999 | Hawkins | 285/206 |
| 6,015,169 | A * | 1/2000 | Funke et al. | 285/136.1 |
| 6,481,086 | B1 * | 11/2002 | Davidson | 29/436 |
| 6,557,825 | B2 * | 5/2003 | Stone et al. | 251/152 |
| 6,883,538 | B2 * | 4/2005 | Toyokawa et al. | 137/454.5 |
| 7,032,933 | B2 * | 4/2006 | Hellman | 285/105 |

FOREIGN PATENT DOCUMENTS

| | | |
|---|---|---|
| DE | 0795712 A1 | 9/1997 |
| EP | 795712 A1 * | 9/1997 |

* cited by examiner

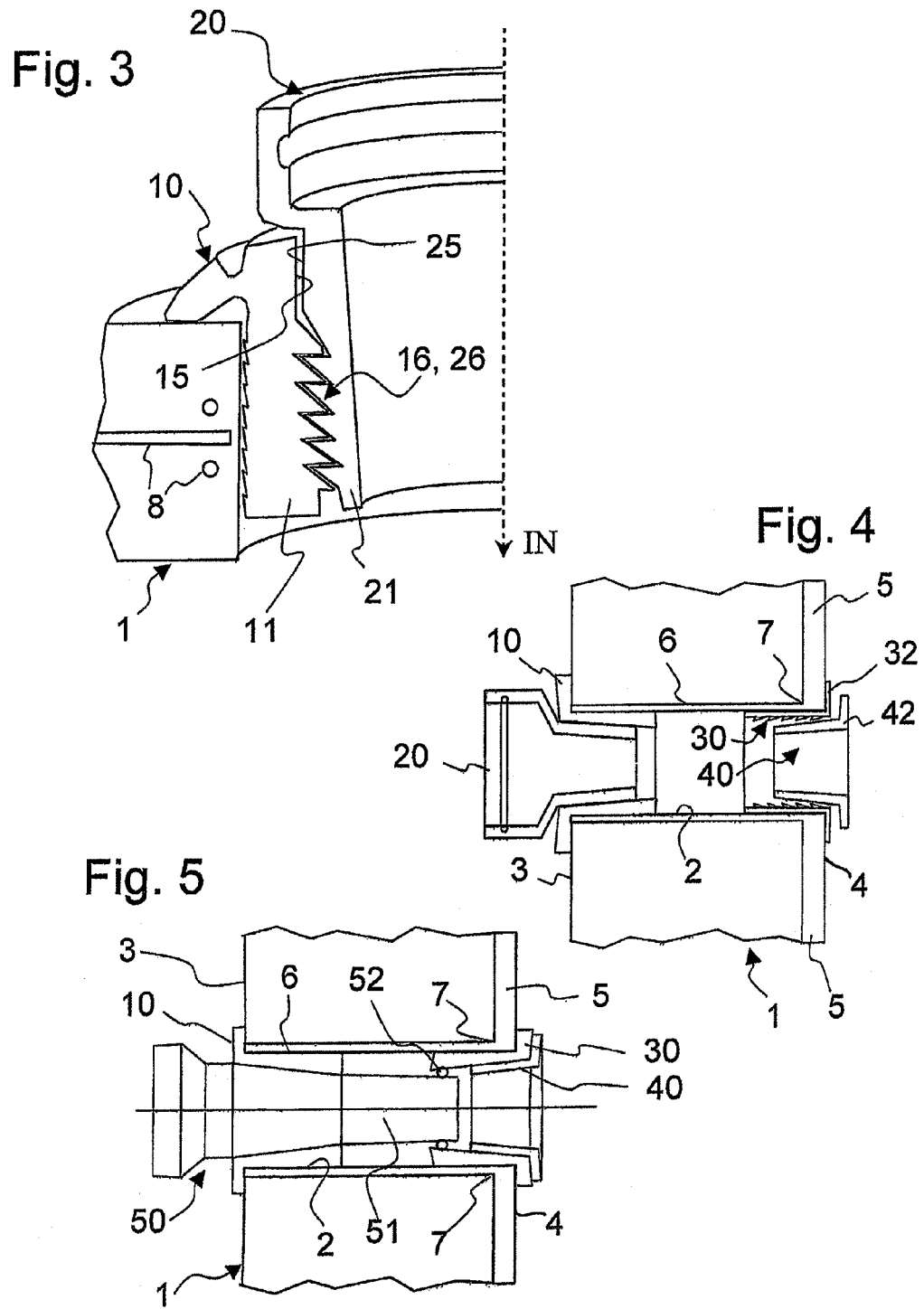

CONNECTOR SEAL COMPRISING RACHET TEETH

CROSS REFERENCE TO RELATED APPLICATIONS

This application is a national stage application of International Application No. PCT/EP2004/007231, filed Jul. 2, 2004, which claims the priority benefit of German Patent Application No. DE 203 10 390.4, filed Jul. 4, 2003.

BACKGROUND OF THE INVENTION

1. Field of the Invention

The invention relates to a connector seal device, for a branch pipe in combination with a transverse opening, such as can be found in the pierced wall of a main pipe, a shaft, or the like, for which the diameter can fluctuate considerably.

2. Related Art

A connector seal device of this type is known from reference EP 0 795 712 B1. The sealing effect of this connector seal device is excellent. It is therefore an object of the present invention to provide an alternative, but similarly effective connector seal device, which can be produced cheaply and can be installed quickly.

BRIEF SUMMARY OF THE INVENTION

An elastomer insert in the shape of a hollow plug is provided for a transverse opening of a wall of a main pipe. The insert includes a relatively soft, tubular sealing wall region adapted to fit into the transverse opening. The elastomer insert is provided with a supporting collar, which forms an end stop on the main pipe, around the transverse opening, and is preferably composed of a softer material than the material for the tubular sealing wall region. A pipe union made of a harder material than the elastomer insert can be inserted into the elastomer insert to press the insert with sufficient force against the pipe wall of the transverse opening during the assembly of the connector seal device. The elastomer insert comprises a region with a tapered inside surface provided with locking ring zones. In a similar manner, the pipe union has a tapered region on the outside surface, which is also provided with locking ring zones. The individual locking ring zones have slanted surfaces, inclined in the insertion direction of the parts, so that the slanted surfaces can glide along each other when the slanted surfaces of the pipe union hit the slanted surfaces of the elastomer insert during the assembly, thereby resulting in a ratchet-type engagement of the locking ring zones when the pipe union is pushed into the opening in the elastomer insert. The locking ring zones are provided with a sliding agent, which can either be applied at the factory or at the construction site. By pushing the pipe union gradually into the opening in the elastomer insert, the pressure exerted onto the elastomer insert is gradually increased until the force of reaction is high enough to prevent a further pushing into each other of the parts, thereby so-to-speak forming an end stop for the pipe union.

In the fully assembled state, the basic surfaces of the elastomer insert and the pipe union are arranged substantially concentric to each other. To encourage this concentric assembly, guide surfaces can be provided on the elastomer insert and the pipe union. Guide surfaces of this type can be provided along the inside circumference of the opening in the elastomer insert, in the region of the supporting collar, and along the outer circumference of the pipe union, in the region of the transition between the engagement end and the sleeve end. Axial guiding devices in the form of axial grooves in the elastomer insert and in the form of axially extending ridges on the pipe union can be provided alternatively or additionally. These guiding devices serve to avoid a slanted positioning during the assembly of the pipe union and the elastomer insert.

According to one modified version of the invention, in addition to the above-mentioned assembly, a second hollow-plug type elastomer insert of in part relatively soft material, provided with locking ring zones, is also fitted into the transverse opening from the inside of the main pipe. Furthermore provided is a hollow press-on cone with locking ring zones that match those on the pipe union. This special embodiment is particularly suitable for use with pipes provided with an inside liner for which the coating on the pipe inside is cut during the subsequent insertion of the transverse opening into the pipe and for which the transition between concrete core material and inside liner coating cannot be re-sealed easily.

The modified version of the invention is helpful in that case because this critical location is covered by the second elastomer insert. The hollow press-on cone is provided for pressing the second elastomer insert in the region of the transverse opening against the pipe wall, wherein this cone is preferably provided with a supporting flange that fits itself against the support collar on the second elastomer insert. In the case of aggressive media, the transverse opening can be protected by applying a coating, wherein the critical transition zone to the inside liner of the pipe is protected by the second elastomer insert against contact with the aggressive media. The pipe union can also be provided with a pipe extension, which fits against a ring-shaped seal in the region of the second elastomer insert or the hollow press-on cone, thereby forming a seal.

According to one embodiment of the invention, the connector seal device according to the invention is provided with at least one sealing rope of a material capable of swelling. A rope of this type can improve the sealing effect as a result of the material swelling up, wherein the material of the sealing rope should swell up in particular when coming in contact with water. A self-sealing effect can thus be achieved if moisture exits from the pipes or enters the pipes from the outside. According to a different modification of the invention, the rope of sealing material capable of swelling is arranged inside a ring-shaped groove in the locking ring zone. A rope of this type can be present in the locking ring zone of the hollow-plug elastomer insert as well as in the locking ring zone of the pipe union.

A different advantageous option for providing a subsequent and/or additional seal calls for providing the connector seal device with at least one sealing element that can be activated by heat. A simple and effective seal can be created according to a further modification of this embodiment by activating a sealing element, which contains a material that increases in volume as a result of heat. Owing to the increase in volume, existing gaps can be filled directly by the sealing material of the sealing element, or other parts of the connector seal device, in particular wall regions of the pipe union and the elastomer insert, can be pressed together. The necessary activation heat can be generated easily by means of an electric resistance heater, as shown with a further modification of the embodiment.

According to one embodiment of the invention, at least one pressure sensor is provided for determining the contact pressure on one of the parts of the connector seal device. With this pressure sensor, it is possible to check whether a desired contact pressure of the parts or a pressure necessary for the sealing effect is achieved for the connector seal device, so that possible leaks can be detected, for example during the assembly of the element or prior to the start of operations.

According to one advantageous modification, several pressure sensors in particular can be provided for determining the contact pressure, wherein these sensors are arranged uniformly spaced apart in circumferential direction of one of the parts of the connector seal device. Differences in the measured pressure values allow determining whether the parts of the connector seal device were joined with a sufficiently uniform sealing force. Various options exist for arranging pressure sensors of this type. The at least one pressure sensor can thus be arranged on or in the elastomer insert. In the same way, one or several sensors can also be present on or in the pipe union. Also possible is an arrangement on or in the press-on cone for the above-described modified version, which is provided with a second elastomer insert, and/or on or in this second elastomer insert.

If the connector seal device has a ring-shaped seal, the pressure sensor or sensors can also be arranged on or in this ring-shaped seal, thereby making it possible to check for the correct seating of this seal and/or the parts of the connector seal device, sealed therewith.

According to yet another embodiment of the invention, at least one transponder and/or one data carrier is provided for detecting, storing and/or transmitting measuring values from one of the parts for the connector seal device. The transponder and/or data carrier thus permits checking whether a desired measuring value is obtained or one that is required for the function of the parts of the connector seal device, for example to detect possible leaks during the assembly of the connector seal device or prior to the start of operations. According to one advantageous modification, several transponders and/or data carriers in particular can be provided for detecting the measuring values, wherein these are arranged uniformly spaced apart in circumferential direction on one of the parts of the connector seal device. Possibly existing differences between the measuring values thus make it possible to determine whether the parts are joined with a sufficiently uniform sealing force. Several options exist for the arrangement of such transponders and/or data carriers. For example, the at least one transponder and/or data carrier can be arranged in or on the elastomer insert. In the same way, one or several transponders and/or data carriers can also be provided on or in the pipe union. Also possible is an arrangement on or in the press-on cone for the above-explained modification with a second elastomer insert, and/or on or in this second elastomer insert. If the connector seal device is provided with a second ring-shaped seal, the transponder or transponders and/or the data carrier or data carriers can also be arranged on or in this seal, which makes it possible to check the correct seating of this seal and/or the parts of the connector seal device provided with this seal.

BRIEF DESCRIPTION OF THE SEVERAL VIEWS OF THE DRAWINGS

The invention is described with the aid of exemplary embodiments, which show in:

FIG. 3 A fully assembled connector seal device;
FIG. 4 A connector seal device for pipes with inside liner;
FIG. 5 A variant of the connector seal device for pipes with inside liner.

DETAILED DESCRIPTION OF THE SEVERAL EMBODIMENTS OF THE INVENTION

Figure 1:
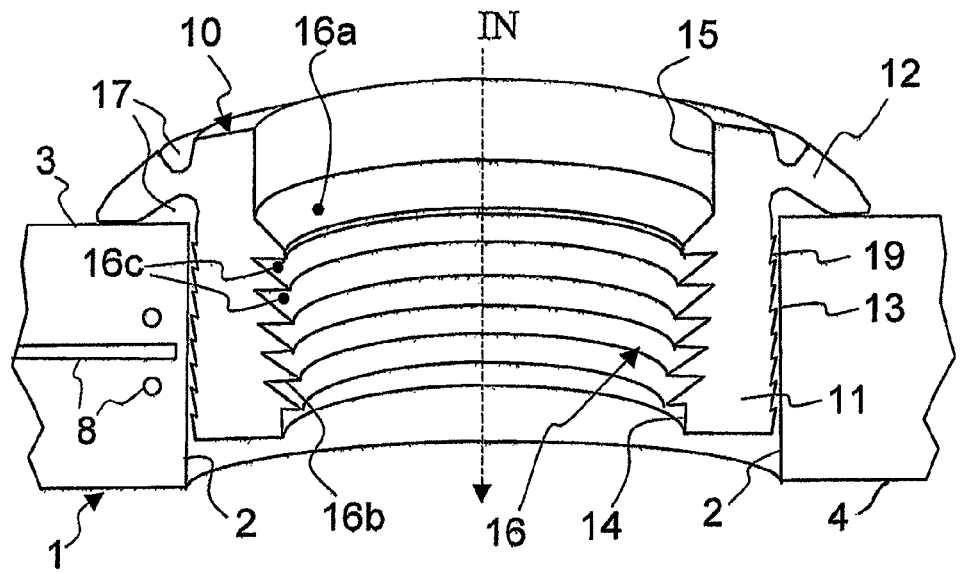
FIG. 1 A section through the edge of an elastomer insert.

We refer to FIG. 1, which shows a hollow-plug type elastomer insert 10, inserted into a transverse opening 2 of a main pipe 1, wherein pipes of this type can be clay pipes or concrete pipes. Reinforced areas 8 are provided in the latter case, which are shown herein as transverse and longitudinal reinforced areas. These reinforced areas 8 can also be cut during the cutting of the transverse opening 2, which is one of the reasons why it is generally not possible to create a transverse opening 2 with precise dimensions, meaning the individual diameter can be irregular, and the diameter can differ from case to case. The same difficulties are encountered with the walls of shafts.

The hollow-plug type elastomer insert 10 comprises a sealing wall region 11 and a flange or support collar 12. The sealing wall region 11 has an outside surface 13 and a tapered inside surface 14.

On the whole, the outside surface 13 is adapted to the diameter of the transverse opening 2, meaning it has a cylindrical or slightly conical shape with an axial length corresponding to the length of the transverse opening 2, wherein the length at least covers the region where the reinforced areas 8 are cut. The inside of the elastomer insert 10 contains a centering section 15 in addition to the tapered inside surface 14. The tapered inside surface 14 is provided with saw-tooth shaped locking ring zones 16, as seen in the cross section. That is to say, they respectively have a surface 16a which is inclined more (shown on the top in the drawing) and a surface 16b which is inclined less. In addition to the ring-shaped teeth, ring-shaped intermediate spaces 16c are consequently also formed between the teeth. The outer surface 13 of the elastomer insert 10 can furthermore be provided with barb-shaped projection 19, which fit against the transverse opening 2 as seen in insertion direction IN for the elastomer insert 10, and block the movement for pulling out the elastomer insert 10.

The support collar 12 is on the whole shaped in the manner of a bell or also a saddle, such that it can support itself along the outer circumference 3 of pipe 1. The saddle shape results from the pipe curvature of the main pipe 1. Notched areas 17 are provided for a flexible support of the support collar 12 along the edge of the transverse opening 2, so that the bell-shaped support collar 12 can assume the shape of a saddle.

The elastomer insert 10 can be composed of material that is composed of different degrees of hardness. The sealing wall region 11 in that case consists of a softer material than the region of the locking ring zones 16 and, if applicable, also the support collar 12. The relatively softer elastomer region 11 thus adapts easier to the irregularities and fluctuations in diameter for the transverse opening 2 that must be sealed, thus forming a tight seal. The slightly higher material hardness of the locking ring zones 16 is selected to allow a sliding along of other locking ring zones 26 of a pipe union 20. A somewhat harder support collar material has a higher resilience, so that it fits more securely against the edge of the transverse opening 2. For the locking ring zones 16 and the support collar 12, harder material characteristics can be combined with other material characteristics (components).

Figure 2:
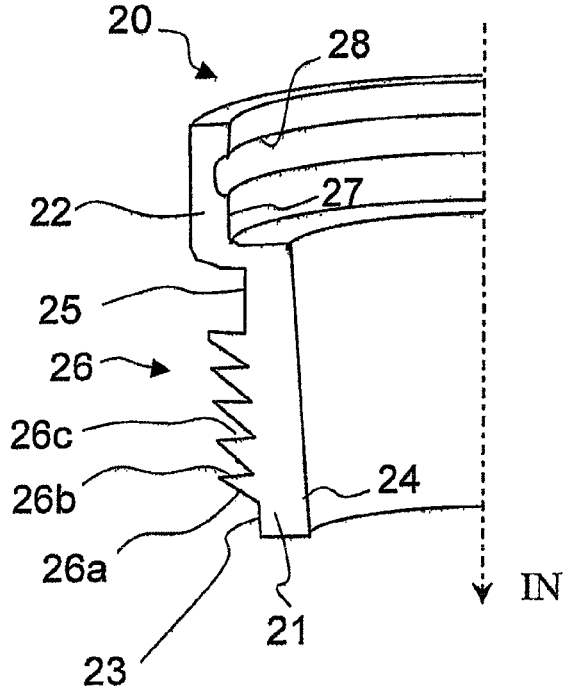
FIG. 2 A section through the edge of a pipe union.

FIG. 2 shows the pipe union 20, composed of a material that is selected to be harder than the material for the elastomer insert 10, even its harder component, wherein this material can be polypropylene (PP), for example, or PVC. The pipe union 20 is provided with a hollow engagement end 21 and a hollow socket end 22. The engagement end 21 comprises a tapered outside surface 23 as well as a tapered inside surface 24. The outside surface additionally comprises a cylindrical centering surface 25. The outside surface 23 is provided with locking ring zones 26 which form a toothing with saw-tooth shaped cross section. The slanted surfaces 26a of the locking ring zones 26, which are in front as seen in insertion direction IN, are slanted counter to the insertion direction IN when seen from the wall of the pipe union 20. The back surfaces 26b, as seen in insertion direction, can be inclined counter to the insertion direction IN, e.g. also seen from the wall of the pipe union 20, so as to achieve a good tooth engagement. The surfaces 26b, however, can also be positioned perpendicular to the insertion direction IN, or can be slightly inclined in the insertion direction. Ring-shaped intermediate spaces 26c are furthermore located between the locking ring zones 26.

The socket end 22 of the pipe union 20 has a cylindrical inside surface 27 with a groove 28 for accommodating a ring-shaped seal that is not shown herein, against which the branch pipe, also not shown herein, fits in order to form a sealed connection. The socket end 22 can be provided with projections for the engagement of an assembly tool.

For the assembly of the connector seal device, the transverse opening 2 is initially prepared for the insertion of the elastomer insert 10 by applying a chemical reaction adhesive or a different type of anti-corrosion material, in particular to cover the reinforced areas 8 which are cut, wherein the material (adhesive—anti-corrosion material) can also be applied with the aid of the elastomer insert 10. In that case, the material is advantageously applied to the outside surface 13 of the elastomer insert 10, or the elastomer insert 10 is delivered with a previously applied coating of this type, which is protected by a covering foil during the storage and transport. The coating material also functions as a sliding agent for inserting the elastomer insert 10. Alternatively, an actual lubricant can be used in place of the adhesive or anti-corrosion material, as is known.

Following the insertion of the elastomer insert 10 (FIG. 1), the pipe union 20 (FIG. 2) is pushed in insertion direction IN into the hollow space of the elastomer insert 10. In the process (FIG. 3), the conical surfaces 26a of the locking ring zones 26 come in contact with corresponding conical surfaces 16a of the locking ring zone 16 on the elastomer insert 10 and engage in the manner of ratchet teeth, so as to mutually snap into the ring-shaped grooves 16c, 26c. Through a further displacement of the pipe union 20 in insertion direction IN, the elastomer insert 10 is expanded step-by-step and, in the process, is pushed with more and more force against the transverse opening 2 in the pipe wall. Owing to the plasticity of the sealing wall region 11, this permits an adaptation to any type of irregularity or fluctuation in the diameter of the transverse opening 2, consequently resulting in an excellent seal at this difficult to seal location.

The pipe union 20 is advantageously inserted strictly in the axial direction of the transverse opening 2 into the hollow space of the elastomer insert 10. Once a specific insertion point is reached, the centering surfaces 15 and 25 come into play and align the pipe union 20 to ensure a precise concentric positioning of the parts relative to each other.

The elastomer insert 10 can be provided with axial grooves which divide the ring zones 16 into individual ring-zone segments for a precise guidance of the pipe union 20 inside the hollow space of the elastomer insert 10. Axially extending ribs can furthermore be provided at the matching locations on the pipe union 20, wherein these ribs engage in the axial grooves on the elastomer insert 10, thus permitting a precise and centered axial guidance of the pipe union 20 during the installation. The term "locking ring zone" or "ring-shaped groove" in the claims therefore should not refer to closed (meaning uninterrupted) geometric forms for these embodiments.

Adhesive can also be applied to at least one of the surfaces 14 or 23, provided with locking ring zones 16, 26, wherein these surfaces are then delivered protected by a covering foil, in a similar manner as for the outside surface 13 of the elastomer insert 10, which can be delivered already coated with an adhesive and protected by a covering foil. A different option for creating a subsequent seal is to fill a re-sealing material into cavities in the elastomer insert 10. These cavities will open up under increased pressure and release the re-sealing material, thereby creating a secondary seal. Cavities of this type can be provided on the inside, near the end of the sealing wall region 11.

FIG. 4 shows a connector seal device with a second elastomer insert 30 and a hollow press-on cone 40. The second elastomer insert 30 matches the first elastomer insert 10, with the difference that the supporting collar 32 of the second elastomer insert 30 is relatively small and is adapted to the inside contour 4 of the pipe 1 while the one for the first insert 10 is adapted to the outside contour 3. The second elastomer insert 30 is used, above all, if the pipe 1 is provided with an inside liner coating 5. If a transverse opening 2 is subsequently cut into a pipe of this type and the bore chamfer is then coated with a coating 6, a critical location 7 is created at the transition between the layers 5 and 6, where aggressive media could attack. The location 7 will crack easily because of differences in the heat expansion between core concrete material and the coating for the inside liner. In that case, the invention helps because the second elastomer insert 30 covers this critical location 7. The press-on cone 40 is provided so that the second insert 30 can be pressed on securely and is therefore pulled into the transverse opening 2 during the assembly of the connector seal device. The press-on cone 40 in that case is provided with a supporting flange 42 in which a hook-shaped tool can engage. Otherwise, the press-on cone 40 is designed to match the pipe union 20 with respect to the locking ring zones 26 which engage in corresponding locking ring zones on the second elastomer insert 30.

So-called pipe-traveling robots are used to push the second insert 30 with press-on cone 40 into the inside 4 of pipe 1. These robots can successively insert the parts 30 and 40 into the transverse opening 2, wherein a hook-shaped tool is used for pressing on these parts 30, 40.

The hook-shaped tool for pressing on the cone 40 can take the form of hook-shaped grippers, which are pushed through the transverse opening 2 into the pipe inside 4. A tool of this type can be embodied similar to an umbrella without cover, meaning the hooks can be folded back to rest against the tool shaft when the hooks are pushed through the transverse opening 2 into the pipe inside 4. Once inside, the hooks can be extended outward to make contact with the supporting flange 42 and to press the cone against the second insert 30.

FIG. 5 shows a modified version of the connector seal device, provided with the second elastomer insert 30. A modified pipe union 50 is used, which is provided with a pipe extension 51. A ring-shaped seal 52 that cooperates with the pipe extension 51 is provided on the second elastomer insert 30, so that the medium flowing through the pipe 1 and the connector seal device does not come in contact with the wall of the transverse opening 2.

The seal 52 could also be installed on the inside of the press-on cone 40. It is furthermore possible to connect the pipe extension 51 force-locking with the press-on cone 40, for which a separate connecting piece can also be used. The invention furthermore permits a gas-impermeable connection between a secondary pipe and a main pipe.

Figure 6:
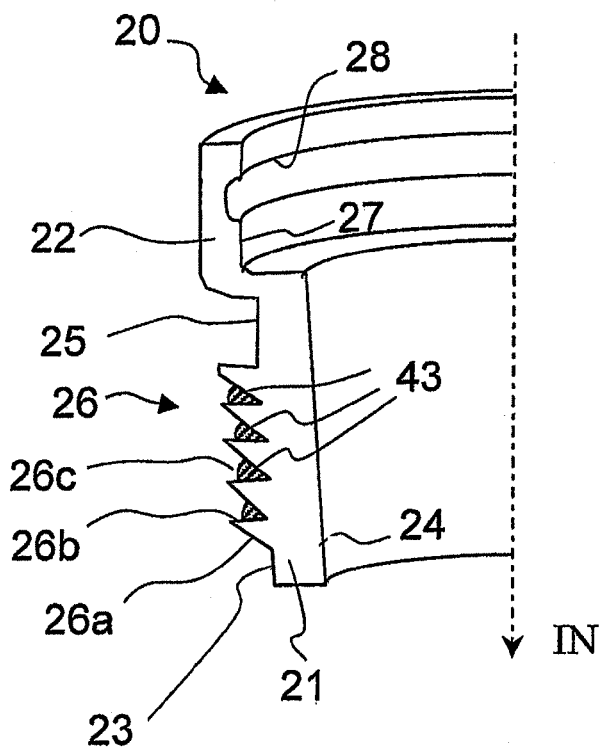
FIG. 6 A modified version of the pipe union shown in FIG. 2.

FIG. 6 shows a modified version of the pipe union 20, shown in FIG. 2, provided with a connector seal device according to the invention. The pipe union 20 shown in FIG. 6 is provided with several ropes 43 of a sealing material capable of swelling, wherein it is particularly advantageous if the sealing material for these ropes 43 swells upon coming in contact with water. For the exemplary embodiment, the ropes 43 of sealing material capable of swelling are respectively arranged between the surfaces 26a, 26b, inside the ring-shaped intermediate spaces (grooves) 26c of the locking ring zone 26.

Figure 7:
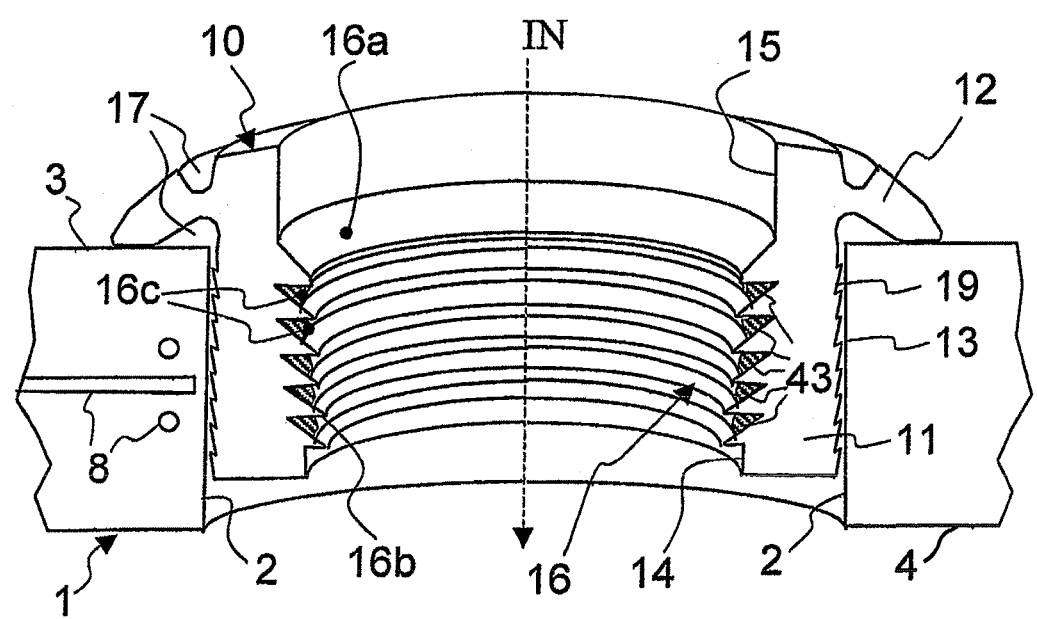
FIG. 7 A modified version of the elastomer insert shown in FIG. 1.

FIG. 7 illustrates a different option of providing a connector seal device with ropes 43 of this type. The ropes 43 of the elastomer insert 10, shown in FIG. 7, are also arranged inside the ring-shaped intermediate spaces (grooves) 16c of the locking ring zone 16 on the elastomer insert 10. Arranging sealing ropes of this type in the region of the locking ring zone, as illustrated in FIG. 6 or FIG. 7, is advantageous because a seal must be created especially in this region through inserting the pipe union 20 and the resulting expansion and pressing-on of the elastomer insert 10. This seal is to be improved by re-sealing it with the aid of the ropes 43 of a material that is capable of swelling.

Figure 8:
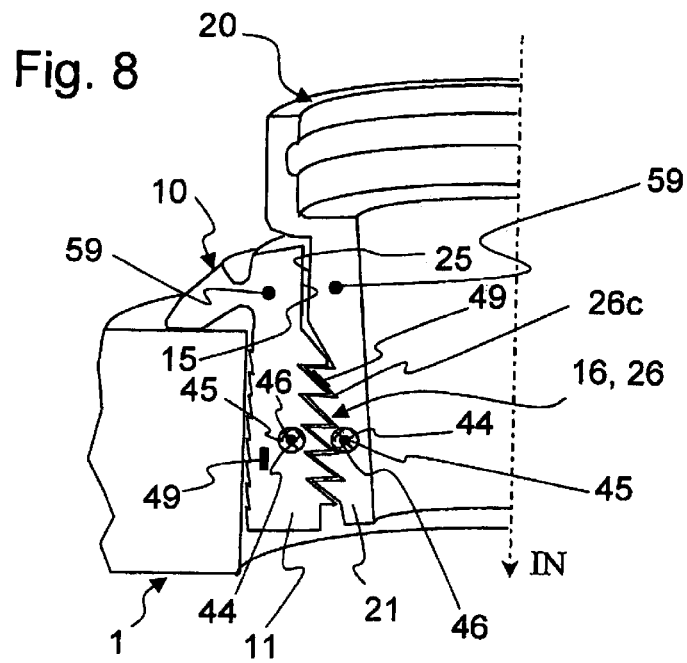
FIG. 8 A modified version of the connector seal device shown in FIG. 3, provided with a sealing element that can be activated.

FIG. 8 shows a further modification of the connector seal device shown in FIG. 3. The fully assembled connector seal device shown in FIG. 8 is additionally provided with a heat activated sealing element 44. For this embodiment, the sealing element 44 takes the form of a rope fitted around the circumference and arranged in the region of the engagement end 21 for the pipe union 20. With the exemplary embodiment shown in FIG. 8, the sealing element 44 extends specifically inside the engagement end 21, below the locking ring zone 26. The sealing element 44 is composed of a material 45 which increases in volume under the effect of heat. Particularly suitable for this is a rubber or plastic material containing expanding agents, or suitable mixtures of rubber and/or plastic material with expanding agents. It is furthermore advantageous if a material of this type can vulcanize under the effect of heat, meaning also in connection with the expanding agent. The material 45 can advantageously increase in volume as a result of foaming, caused by the release of a gas in the expanding agent due to the effect of heat. The material 45 can additionally be surrounded by an elastic or expandable wrapper to protect it against environmental influences.

To generate the heat effect, the sealing element 44 is furthermore provided with an electric resistance heater 46 in the form a heating wire that extends on the inside of the material 45 and is provided with external leads, not shown in FIG. 8, wherein these leads can be connected to an external power source once the connector seal device is assembled. During the operation of the resistance heater 46, the material 45 swells and thus also deforms the adjacent wall region of the locking ring zone 26 which, in particular, bulges outward as a result of the swelling of the material 45 and presses against the locking ring zone 16 of the elastomer insert 10, so as to create a seal. FIG. 8 shows that such a sealing element can additionally or alternatively be provided in the elastomer insert 10, for example on the inside of the elastomer insert 10, below the sealing wall region 1.

Of course, several sealing elements 44 of this type can also be provided in the elastomer insert 10 and/or the pipe union 20. Furthermore, other outside surfaces of the elastomer inserts 10 and/or the pipe union 20 can be provided either alternatively or additionally with a secondary seal, by using a suitable arrangement of one or several sealing elements. For example, one or several sealing elements 44 can be arranged in the centering section 15 or below the centering surface 25.

The connector seal device shown in FIG. 8 is furthermore provided with one or several pressure sensors 49, wherein these sensors 49 are used to detect the contact pressure of the respective parts. Different options for arranging the sensors 49 exist, for example by arranging a sensor 49 inside the elastomer insert 10, as shown in FIG. 8. Particularly advantageous is the arrangement of several sensors 49 of this type while spaced apart in circumferential direction on the elastomer insert 10, wherein it is preferable to arrange four sensors 49 of this type along a circle extending in circumferential direction of the sealing wall region 11, uniformly spaced along the inside of the elastomer insert 10. During the insertion of the pipe union 20, the sealing wall region 11 is compressed in the radial direction, so that pressure is exerted onto the sensors 49 and a corresponding measuring signal can be read out. If the measuring values from the individual sensors 49 differ considerably, it indicates a leak or at least a poor seal and corrective measures can be taken, for example by correcting the position of the pipe union 20. Deviations in the received minimum and maximum measuring values of at least 20% to 50% or more, for example, can indicate that the contact pressure along the circumference is uneven and a leak probably exists. Furthermore, if the detected contact pressure is not sufficiently even, an additional sealing element 44 can be activated to obtain a tighter seal.

FIG. 8 illustrates a different option for arranging pressure sensors 49 of this type, wherein the sensors 49 in this arrangement are positioned on the outside surface of the pipe union 20, in the locking ring zone 26 of the engagement end 21, for example on the outside surface of a ring-shaped groove 26c, as shown in FIG. 8.

Figure 10:
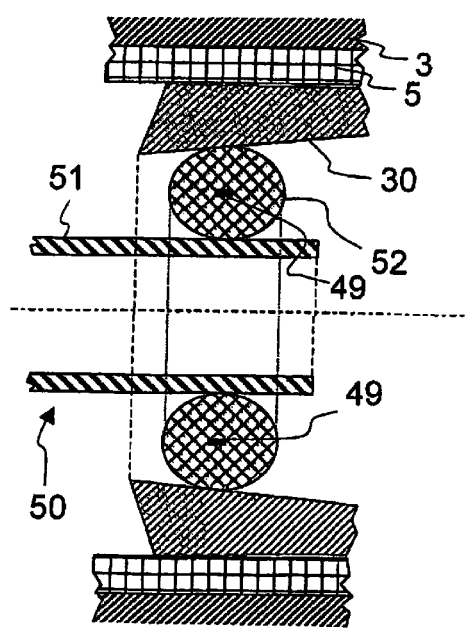

Yet another option for an advantageous arrangement of sensors 49 is illustrated in FIG. 10. FIG. 10 shows a detail of a modified version of the embodiment shown in FIG. 5, of a connector seal device according to the invention. This Figure shows the region of the connector seal device with the ring-shaped seal 52, which cooperates with the pipe extension 51 of the modified pipe union 50. The ring-shaped seal 52 is provided with several pressure sensors 49 for checking the sealing capacity of the ring-shaped seal 52 and the correct assembly of the connector seal device, wherein these sensors can again be arranged uniformly spaced apart along the periphery of the seal 52. Four sensors 49 of this type are preferably used, of which only two sensors 49 can be seen because of the sectional representation in FIG. 10. With this exemplary embodiment, the pressure sensors 49 are arranged on the inside of seal 52. According to one variant of this embodiment, the sensors 49 are arranged on the outside of the seal 52. With a ring-shaped seal 52 provided with sensors 49, an analysis of the measuring values received from the sensors 49 can again indicate whether the seal 52 is seated correctly and does not leak.

The configurations for the pressure sensors 49, shown in FIG. 8 and FIG. 10, are only intended as exemplary embodiments and the pressure sensors 49 can also be arranged at other locations on the connector seal device. It is generally advantageous if the sensors 49 are arranged at locations where a sealing effect must be achieved by pressing together the surfaces of various parts.

The connector seal device shown in FIG. 8 is furthermore provided with one or several transponders and/or data carriers 59 for detecting, storing and/or transmitting measuring values from the respective parts, wherein different options exist for arranging the transponders and/or data carriers 59. For example, a transponder and/or data carrier 59 can be arranged on the inside of the elastomer insert 10, as shown in FIG. 8. In that case, it is particularly advantageous that deviations from the measured minimum and maximum values of at least 20% to 50% or more, for example, indicate that the contact pressure along the circumference is not uniform enough and that a leak probably exists. Furthermore, once it is determined that the detected contact pressure is not sufficiently uniform, a sealing element 44 can be activated to obtain an improved seal.

FIG. 8 shows a different option for arranging transponders and/or data carriers 59 of this type. With this type of arrangement, the transponders and/or the data carriers 59 are located inside the pipe union 20.

The pressure sensors (49), the transponders and/or the data carriers (59) can advantageously be used to test whether a measuring value that is required for the function of the connector seal device parts (10, 20, 30, 40, 50) can be achieved. This can be done during the assembly of the connector seal device, but also during the installation, the initial operation, and/or while the connector seal device is in use.

Figure 9:
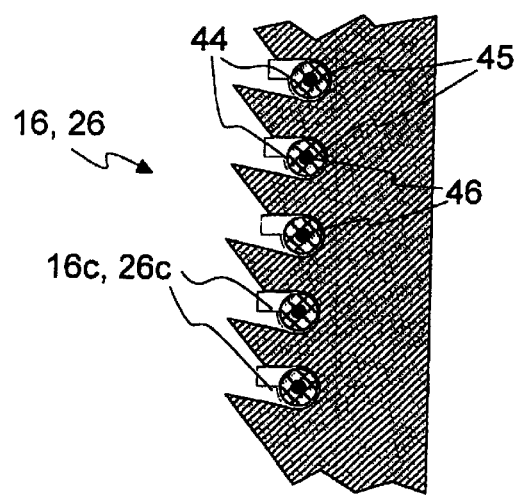
FIG. 9 A detail of the connector seal device with an alternative arrangement of a sealing element that can be activated, and
FIG. 10 An enlarged detail of a modified version of the embodiment shown in FIG. 5.

FIG. 9 shows a detail of the connector seal device with a different type of arrangement for a sealing element 44. With this type of embodiment of the invention, the sealing element 44 which can be activated is not positioned on the inside, but in a groove on an outside surface of one of the parts for the connector seal device. With the exemplary embodiment shown in FIG. 9, the outside surface with the sealing elements 44 represents the locking ring zone 16 on the elastomer part 10 or the locking ring zone 26 on the pipe union 20, wherein the sealing elements 44 (similar to the ropes 43 of swelling material shown in FIGS. 6 and 7) are respectively arranged inside the ring-shaped grooves 16c and/or 26c.

The invention claimed is:

1. A connector seal device for connecting a branch pipe to a transverse opening of a main pipe, the connector seal device comprising:
   a hollow elastomer insert composed in part of a first material, the elastomer insert including:
      a flexible support collar; and
      a sealing wall region with an inside surface tapered in an insertion direction and having first locking ring zones and an outside surface adapted to fit a diameter of the transverse opening, wherein the first locking ring zones comprise a first plurality of ring-shaped teeth and ring-shaped grooves defining a saw-tooth shaped cross section; and
   a pipe union of a second material, the second material being harder than the first material, the pipe union including:
      an engagement end with an outside surface tapered in the insertion direction and being adapted to cooperate with the inside surface of the elastomer insert, the outside surface having second locking ring zones comprising a second plurality of ring-shaped teeth and ring-shaped grooves defining a saw-tooth shaped cross section; and
      a socket end adapted to cooperate with the branch pipe, whereby when the elastomer insert is inserted in the insertion direction into the transverse opening and the pipe union is pushed in the insertion direction into the elastomer insert, the first and second locking ring zones engage in the manner of ratchet teeth and the elastomer insert is expanded and pressed further against the transverse opening through the continued displacement of the pipe union in the insertion direction.

2. The connector seal device as defined in claim 1, wherein the first locking ring zones are composed of a third material, the third material being harder than the first material but softer than the second material.

3. The connector seal device as defined in claim 1, wherein the first and second locking ring zones are provided with a sliding agent.

4. The connector seal device as defined in claim 1, wherein the tapered inside surface of the elastomer insert is adapted to form an end stop or assembly stop for the insertion of the pipe union.

5. The connector seal device as defined in claim 1, wherein when the pipe union is inserted into the elastomer insert, the elastomer insert and the pipe union are arranged substantially concentric, wherein a first centering section on the elastomer insert is arranged to cooperate with a second centering section on the pipe union.

6. The connector seal device as defined in claim 1, wherein the outside surface of the elastomer insert is substantially cylindrical and includes barb-shaped projections arranged to fit against the transverse opening during installation of the elastomer insert into the transverse opening in the insertion direction and block any movement of the elastomer insert counter to the insertion direction.

7. The connector seal device as defined in claim 1, wherein the sealing wall region of the elastomer insert is a tubular section with sufficient length to cover a reinforced area of the transverse opening.

8. The connector seal device as defined in claim 7, wherein the outside surface of the elastomer insert is coated with an anti-corrosion agent and/or an adhesive, the anti-corrosion agent and/or adhesive being protected by a cover foil during storage and transport of the connector seal device, until just prior to installation of the connector seal device in the transverse opening.

9. The connector seal device as defined in claim 1, wherein the sealing wall region of the elastomer insert comprises at least one groove filled with a sealing agent adapted to be released during installation of the pipe union in the elastomer insert.

10. The connector seal device as defined in claim 1, wherein the support collar of the elastomer insert is composed of a harder material than the sealing wall region.

11. The connector seal device as defined in claim 1, wherein the support collar of the elastomer insert is adapted to fit the outer circumference of the main pipe.

12. The connector seal device as defined in claim 1, further comprising a second hollow elastomer insert composed in part of the first material, the second elastomer insert adapted to be inserted from an inside of the main pipe into the transverse opening; and a hollow press-on cone adapted to be inserted into the second elastomer insert, wherein the second elastomer insert and the hollow press-on cone include locking ring zones corresponding to those on the elastomer insert and the pipe union, respectively.

13. The connector seal device as defined in claim 12, wherein an engagement end of the hollow press-on cone includes a support flange adapted to fit against the support collar of the second elastomer insert.

14. The connector seal device as defined in claim 12, wherein the pipe union includes a pipe extension adapted to fit against a ring-shaped seal on the second elastomer insert or against the hollow press-on cone to form a seal.

15. The connector seal device as defined in claim 12, wherein the pipe union has a pipe extension and/or a separate connecting piece, so that it is adapted to form a force-locking connection with the hollow press-on cone.

16. The connector seal device as defined in claim 1, further comprising at least one rope of a sealing material that is capable of swelling.

17. The connector seal device as defined in claim 16, wherein the sealing material of the rope is configured to swell when it comes in contact with water.

18. The connector seal device as defined in claim 16, wherein the at least one rope of the sealing material is arranged in at least one of the ring-shaped grooves of the first or second locking ring zones.

19. The connector seal device as defined in claim 1, further comprising at least one sealing element adapted to be activated by heat.

20. The connector seal device as defined in claim 19, wherein the sealing element comprises a material which increases in volume under the effect of heat.

21. The connector seal device as defined in claim 19, wherein the sealing element includes an electric resistance heater.

22. The connector seal device as defined in claim 1, further comprising at least one pressure sensor for detecting contact pressure on a part of the connector seal device when the connector seal device is installed in the transverse opening of the main pipe.

23. The connector seal device as defined in claim 22, wherein the at least one pressure sensor comprises several pressure sensors arranged uniformly spaced apart in a circumferential direction of a part of the connector seal device.

24. The connector seal device as defined in claim 22, wherein the at least one pressure sensor is arranged on or in the elastomer insert, the pipe union, or a hollow press-on cone.

25. The connector seal device as defined in claim 22, wherein the at least one pressure sensor is arranged on or in a ring-shaped seal.

26. The connector seal device as defined in claim 22, further comprising at least one transponder and/or data carrier for detecting, storing, and/or transmitting the contact pressure values measured on the part of the connector seal device.

27. The connector seal device as defined in claim 26, wherein the at least one transponder and/or data carrier is arranged on or in the elastomer insert, the pipe union, or a hollow press-on cone.

28. The connector seal device as defined in claim 1, wherein each of the first ring-shaped teeth has a first conical surface inclined in the insertion direction, and wherein each of the second ring-shaped teeth has a second conical surface inclined counter to the insertion direction, whereby when the pipe union is pushed in the insertion direction into the elastomer insert, at least one first conical surface and at least one second conical surface contact and glide along each other until at least one of the first ring-shaped teeth and at least one of the second ring-shaped teeth mutually snap into the respective ring-shaped grooves.

* * * * *